US008832129B1

(12) United States Patent
Hansen

(10) Patent No.: US 8,832,129 B1
(45) Date of Patent: *Sep. 9, 2014

(54) DYNAMIC CATEGORIZATIONS FOR ELECTRONIC ADVERTISING

(75) Inventor: Lucas P. Hansen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/621,080

(22) Filed: Sep. 15, 2012

Related U.S. Application Data

(63) Continuation of application No. 12/204,663, filed on Sep. 4, 2008, now Pat. No. 8,301,649.

(51) Int. Cl.
*G06F 7/00* (2006.01)
*G06F 17/30* (2006.01)

(52) U.S. Cl.
USPC .......................................... 707/758; 705/14.4

(58) Field of Classification Search
None
See application file for complete search history.

(56) References Cited

U.S. PATENT DOCUMENTS

| | | | |
|---|---|---|---|
| 7,523,087 B1 | 4/2009 | Agarwal et al. | |
| 7,668,832 B2 | 2/2010 | Yeh et al. | |
| 7,680,796 B2 | 3/2010 | Yeh et al. | |
| 7,716,161 B2 | 5/2010 | Dean et al. | |
| 7,788,159 B1 | 8/2010 | Sack | |
| 7,831,456 B2 | 11/2010 | Demir et al. | |
| 2003/0055816 A1 | 3/2003 | Paine et al. | |
| 2005/0050027 A1 | 3/2005 | Yeh et al. | |
| 2005/0050097 A1 | 3/2005 | Yeh et al. | |
| 2005/0076014 A1 | 4/2005 | Agarwal et al. | |
| 2005/0137939 A1 | 6/2005 | Calabria et al. | |
| 2005/0222901 A1 | 10/2005 | Agarwal et al. | |
| 2005/0251444 A1 | 11/2005 | Varian et al. | |
| 2006/0036583 A1 | 2/2006 | Sondergaard et al. | |
| 2006/0122889 A1* | 6/2006 | Burdick et al. | 705/26 |
| 2006/0212350 A1 | 9/2006 | Ellis et al. | |
| 2007/0050389 A1 | 3/2007 | Kim et al. | |
| 2007/0078708 A1 | 4/2007 | Yu et al. | |
| 2007/0078709 A1 | 4/2007 | Rajaram | |
| 2007/0157228 A1 | 7/2007 | Bayer et al. | |

(Continued)

OTHER PUBLICATIONS

Fong et. al. "Online Analytical mining of Path Traversal Patterns for Web Measurment". Oct. 2002. Idea Group Inc. vol. 13. Issue 4. pp. 39-61.*

(Continued)

*Primary Examiner* — Robert Beausoliel, Jr.
*Assistant Examiner* — Michael Pham
(74) *Attorney, Agent, or Firm* — Novak Druce Connolly Bove + Quigg LLP

(57) ABSTRACT

An advertiser submitting a sponsored ad to a provider can determine aspects of the ad, such as creative elements and bid price, based on a dynamic categorization of an item and/or landing page associated with the ad. An algorithm can be used that utilizes a browse tree for each item to be displayed to a user following a sponsored link, for example, and attempts to find a node in the browse tree that appears at the lowest level in the tree and with a sufficient appearance frequency. When consensus is reached for a node in the browse tree that meets these criteria, a corresponding categorization is determined, which can be used to determine appropriate aspects to be used for the sponsored ad, at least until enough information is obtained such that aspects can be determined independent of the categorization.

26 Claims, 6 Drawing Sheets

(56) References Cited

U.S. PATENT DOCUMENTS

| | | |
|---|---|---|
| 2007/0179832 A1 | 8/2007 | Reich |
| 2007/0192794 A1 | 8/2007 | Curtis et al. |
| 2007/0233556 A1 | 10/2007 | Koningstein |
| 2007/0288454 A1 | 12/2007 | Bolivar et al. |
| 2008/0082655 A1 | 4/2008 | Goswami |
| 2008/0243797 A1 | 10/2008 | Song et al. |
| 2008/0249991 A1 | 10/2008 | Valz |
| 2008/0255921 A1 | 10/2008 | Flake et al. |
| 2008/0288328 A1 | 11/2008 | Minor et al. |
| 2008/0294524 A1 | 11/2008 | Badros et al. |
| 2009/0106096 A1 | 4/2009 | Horowitz |
| 2009/0254414 A1 | 10/2009 | Schwarz et al. |
| 2009/0299831 A1 | 12/2009 | Li et al. |
| 2010/0005001 A1 | 1/2010 | Aizen et al. |
| 2010/0131350 A1 | 5/2010 | Yeh et al. |

OTHER PUBLICATIONS

U.S. Appl. No. 12/204,636, filed Sep. 4, 2008, for Luke A. Snyder et al.

U.S. Appl. No. 12/204,650, filed Sep. 4, 2008, for Luke A. Snyder et al.

U.S. Appl. No. 12/204,680, filed Sep. 4, 2008, for Luke A. Snyder et al.

U.S. Appl. No. 12/267,833, filed Nov. 10, 2008, for David J. Langrock et al.

U.S. Appl. No. 12/267,870, filed Nov. 10, 2008, for Luke A. Snyder et al.

* cited by examiner $A \rightarrow C \rightarrow I$ $A \rightarrow D \rightarrow K$ $A \rightarrow D \rightarrow L$ $B \rightarrow F \rightarrow O$ Level 1: A:3, B:1

Level 2: C:1, D:2, F:1

Level 3: I:1, K:1, L:1, O:1

DYNAMIC CATEGORIZATIONS FOR ELECTRONIC ADVERTISING

CROSS REFERENCE TO RELATED APPLICATION

This application is a continuation of allowed U.S. patent application Ser. No. 12/204,663, filed Sep. 4, 2008, which is hereby incorporated herein by reference for all purposes.

BACKGROUND

As the number of users viewing information and purchasing items electronically increases, there is a corresponding increase in the amount of advertising revenue spent in electronic environments. In some cases, advertisements are specifically selected for certain pages or other interfaces displayed to a user. In other cases, these advertisements are selected based on content that can be displayed in any of a number of different pages. For example, a user might search for information about a keyword through a search engine. When a results page is returned to the user that includes search results relating to that keyword, at least one advertisement can be included with the results page that relates to the keyword and/or search results. Often, the advertisement includes a hypertext link or other user-selectable element that enables the user to navigate to another page or display relating to the advertisement.

The selection of the content to include with the advertisement, such as text, graphics, audio, and/or video for the advertisement, as well as the page to which the user may navigate (hereinafter referred to as the "landing page"), should be determined such that the user viewing the advertisement on the search results page not only will be interested in following the link, but in the case of advertising an item, also will be likely to buy or otherwise consume the advertised item. In conventional systems, generic templates were selected for categories that included a number of keywords, such that whenever one of those keywords was submitted by a user, an advertisement for a general category would be shown, which might not be very relevant to the actual keyword that was submitted. Such an approach does not take into account various factors that can increase revenue, conversions, etc., or otherwise result in a dynamic selection of an optimal advertisement to display to a user.

Further, in many cases there will be multiple advertisers bidding or otherwise attempting to have their advertisement(s) displayed for a given keyword. In such a case, it can be desirable for an advertiser to accurately determine the amount of money the advertiser should bid for any given keyword. When there is not enough data available to make such a decision, conventional systems might simply rely on an average or other default bid amount. For electronic marketplaces or other large advertisers where there may be millions of keywords, making more accurate estimates of the amount to bid for each keyword can result in significant savings and/or additional revenue for the advertiser.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to determining aspects of elements such as advertisements and sponsored links in an electronic environment. Systems and methods in accordance with various embodiments provide approaches for dynamically categorizing items and/or landing pages to be associated with at least one of the advertisements, sponsored ads, and/or sponsored links. As known in the art, "sponsored links" or "sponsored ads" are typically used with electronic interfaces such as Web sites, search engines, applications, etc., wherein an advertiser provides a navigational element such as a hypertext link and associated text and/or graphics to be displayed in the electronic interface, that enable a user to select or otherwise access the navigational element to be directed to a page or other location provided by the advertiser. The advertiser typically will pay a provider of the electronic interface based upon an aspect of each sponsored ad, such as the number of times users select the navigational element included therein.

Systems and methods in accordance with various embodiments provide an automated solution to the problem of determining aspects associated with such a sponsored ad, such as the "creative elements" associated with the ad. A creative element can be any element such as text, graphics, audio, and/or video that is created and displayed or otherwise transmitted to a user as part of the sponsored ad. Various approaches also provide for the determination of appropriate bidding or other financial amounts to be associated with the sponsored ad. In one example, an advertiser might select to advertise when a user submits a keyword into a search engine and receives a page of search results. The advertiser might also determine an optimal page (hereinafter referred to as a "landing page") to which to direct the user when selecting a navigational element for such a sponsored ad. In placing the ad, the advertiser must decide the creative elements to include with the ad, which in at least some embodiments preferably relates in some way to the item and/or landing page to which the user is to be directed. Further, the advertiser would like to bid and/or pay an amount that is commensurate with the expected revenue, conversion rate, or other expected financial return as a result of the advertisement. Systems and methods in accordance with various embodiments provide approaches to dynamic categorization at multiple levels that allow for accurate and dynamic determination of categories for specific items and/or landing pages, which enables these approaches to further select appropriate creative elements, bid amounts, and/or other such aspects based thereon.

Figure 1:
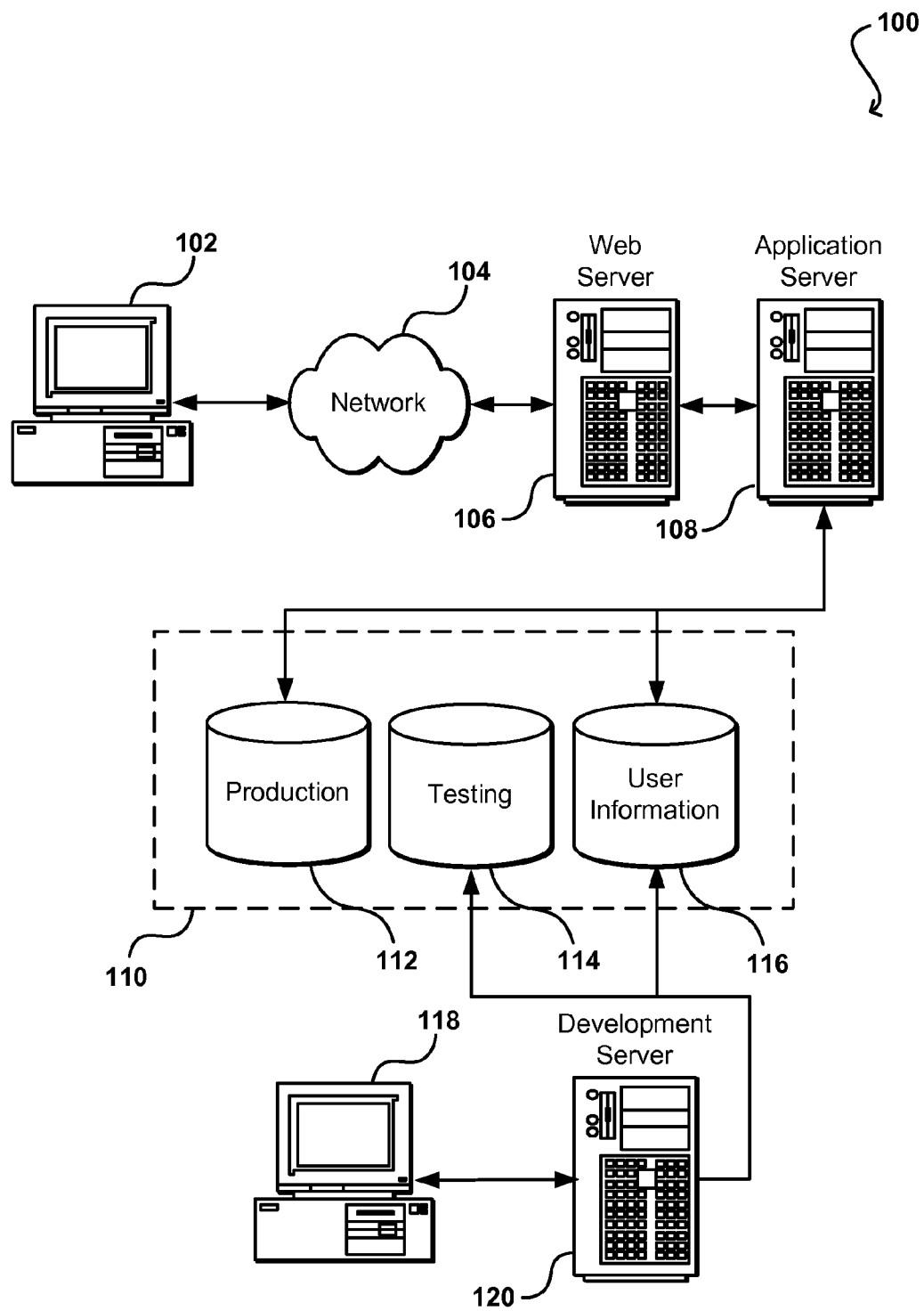
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
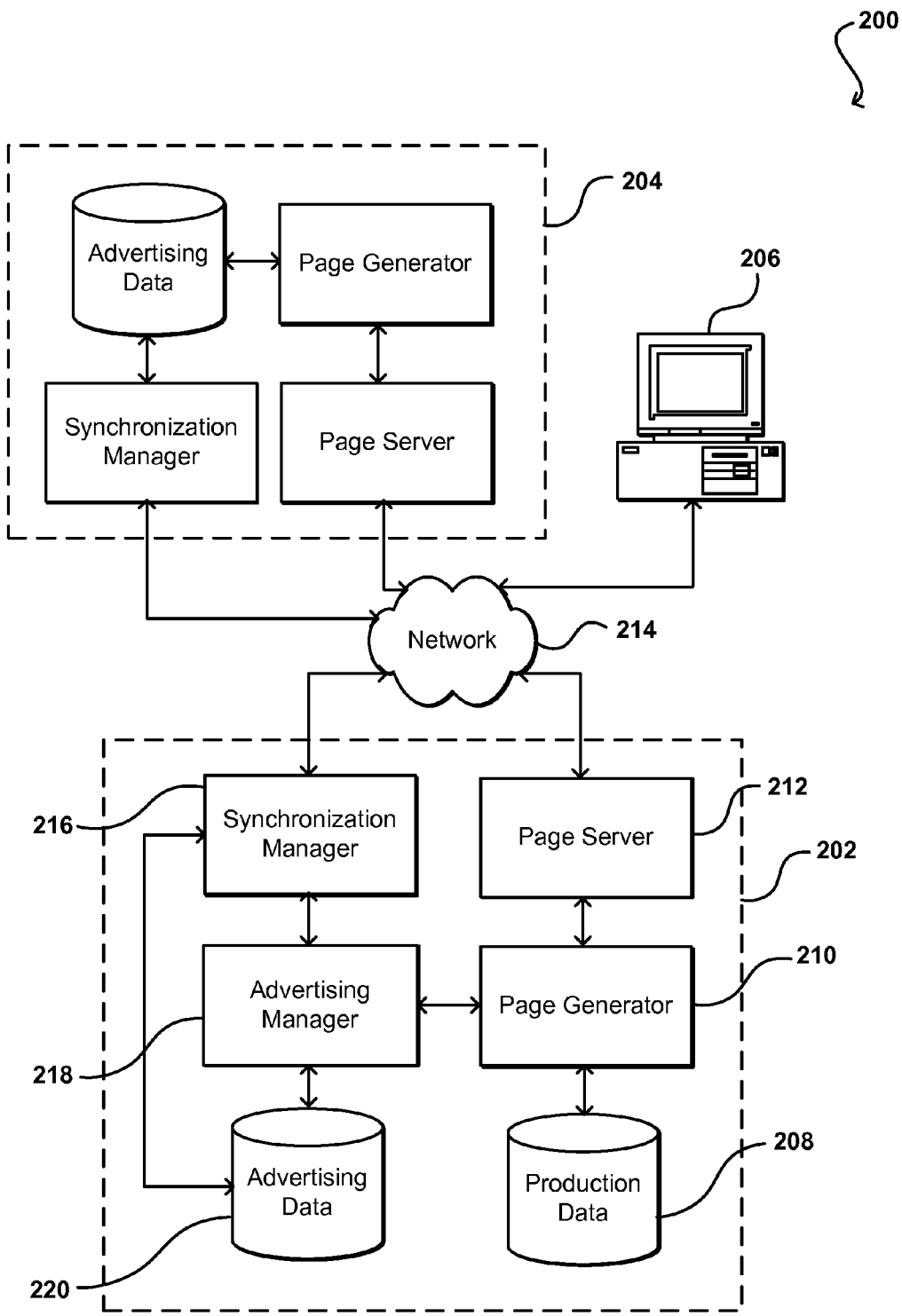
FIG. 2 illustrates components for determining aspects of advertisements to provide to a separate provider that can be used in accordance with one embodiment.

An environment such as that illustrated in FIG. 1 can be useful for a provider such as an electronic marketplace, wherein multiple associates or other content providers might wish to advertise on pages for the marketplace itself. As discussed above, however, sometimes a provider such as an electronic marketplace might wish to advertise on other sites or with other providers. The electronic environment in such a case might include additional components and/or other arrangements, such as those illustrated in the configuration 200 of FIG. 2. In this example, components for an advertising entity 202 can generate advertising associations such as keyword-landing page pairs, as well as related elements such as creative elements and bid prices, to be submitted to components for another provider 204. It should be understood that while keyword-landing page pairs and sponsored ads are used for purposes of explanation, any association of a navigational process with content in an electronic environment can be used with, and benefit from, selections and other processes described with respect to various embodiments.

In this example, the advertising entity generates and serves pages of content available to any appropriate end user 206, and thus can include components such as a production data store 208 that can be used by a page generator 210 to generate pages that can be served by a page server 212 (such as a Web server in a Web-based environment) over a network 214 to the end user 206. Similarly, any other appropriate provider 204 can include components such as page generator and page server components for generating and serving pages of content to a user. While many of the embodiments are described with respect to a Web-based environment, it should be understood that pages are not limited to Web pages, but can include any application page or other interface page that can be displayed or otherwise conveyed to a user.

If the advertising entity 202 wishes to advertise with the provider 204 using sponsored links or other advertisements that direct a user back to a page provided by the advertising entity, the advertising entity also can include components for determining the landing pages to be associated with the advertisements. While the advertising components in this example are shown to be part of the advertiser's system, it should be understood that these components can be part of a separate system or provided as a third party service, for example. In this example, the advertising entity system includes an advertising manager 218, which as discussed elsewhere herein can encompass, monitor, and/or control a number of different algorithms and components for selecting and deciding upon landing pages, as well as dynamically determining categories for each selected landing page, applying templates and/or creative elements for each category, and determining appropriate bid prices to use for each advertisement. When the advertising manager 218 decides on a landing page, category, and other such information to be associated with content on the provider pages, the advertising manager 218 can store the advertising data to an advertising data store 220, which in some embodiments can comprise separate tables in the production data store 208. The advertising data store can include any information related to advertising, such as ad performance data, bid histories, bid amounts, categorizations, creative elements, etc. Portions of this data alternatively can be stored and/or accessed from other appropriate storage devices of the system and/or across the network. The advertising entity's system also can include a synchronization manager 216 that can work with a synchronization component of the provider 204 to periodically synchronize the advertising data with the advertising data stored at the provider 204, such that the appropriate landing pages, creative content, and financial information can be designated and updated as desired. When a user 206 views a page of content served by the provider 204, the page can include an advertisement that will direct the user to a page of the advertising entity 202 upon selection by the user.

Figure 3:
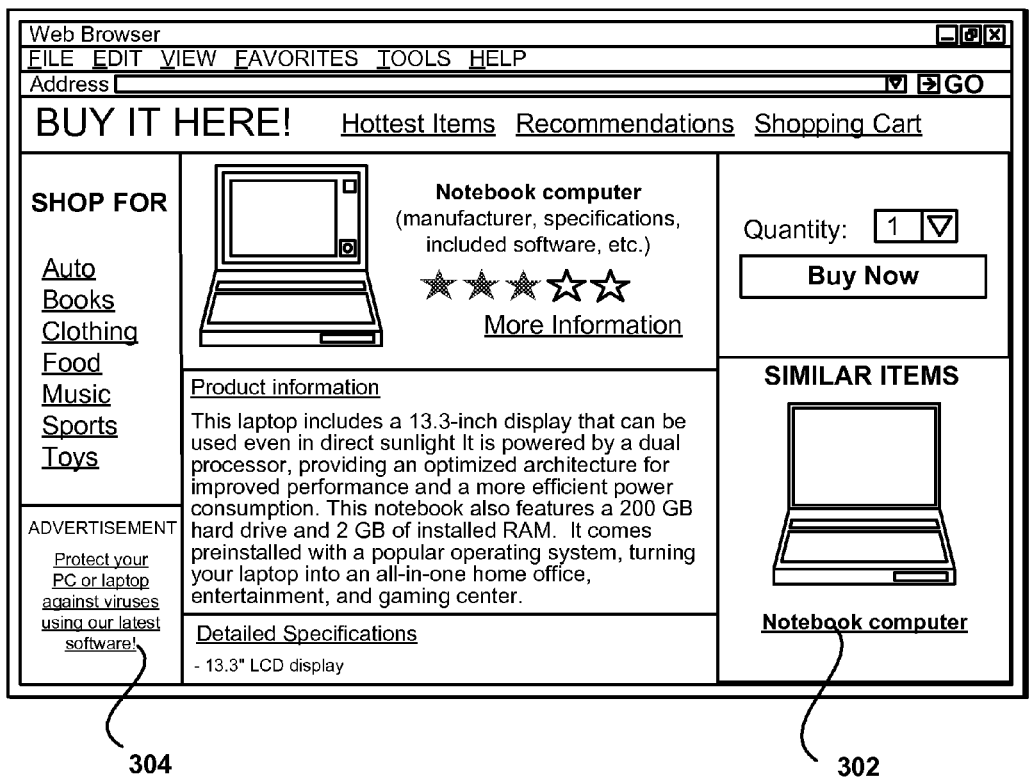
FIG. 3 illustrates an interface including a sponsored link that can be generated in accordance with one embodiment.

As discussed above, the advertisement can include at least one sponsored link, such as a hypertext links displayed on a Web page, for example. FIG. 3 illustrates an example of a Web page 300 displayed in a browser application, wherein the Web page includes a sponsored link 302 that directs a user to another portion of the site when selected, and another sponsored link 304 that directs the user to a site of a third party advertiser, etc. Sponsored links can be selected based on any appropriate factor, such as content of a page, a keyword used to navigate to that page, etc. Sponsored links also can be displayed on any other appropriate interface capable of following a link or similar navigational element to another source of information, and as such the term "link" will be used for purposes of explanation but should not be interpreted as limiting the types of navigational elements that can be used with various embodiments.

As discussed, sponsored links in one example are displayed when a user searches for information in a search engine, and receives a list of search results (referred to herein as a "results page"). There are many aspects to deciding which sponsored links might be desirable to be displayed on such a results page. For example, advertisers may wish to display ads that are relevant to the content of the search results, which might be of interest to the user. For example, a user searching for information on automobiles can, on average, be more likely to purchase a book on automotive repair than a set of steak knives. Thus, the advertiser would prefer to spend the advertising money with respect to those keywords or categories which are "relevant" to the item (e.g., any product or service that can be consumed) being advertised. Further, a category can have many subcategories, and an advertiser might not decide that the advertiser wants to spend money to advertise for an "automotive" category, but would rather advertise for an "automotive books" sub-category.

Once an advertiser decides which keywords, categories, or other aspects for which to advertise, such as by using an advertising manager as discussed above, the advertiser also has to decide how much the advertiser is willing to spend for each instance of that advertisement. In many major search engines, there can be several advertisers wishing to advertise for a given keyword or category, for example, and at least some of those advertisers are willing to pay a premium for being the most prominently featured advertisement displayed for a given keyword. In some cases only one advertisement with a link will be displayed, while in other cases there can be a list or set of ads displayed, and an advertiser might pay extra to be displayed closer to the top of a results page, etc. Many search engine and other such providers then allow these advertisers to bid for ad space, with the winning bid being displayed most prominently, and lower bids being displayed less prominently, if at all. An advertiser must then not only decide how much to bid for an advertisement based on projected conversions or revenue for each advertisement, but also must consider the placement of the advertisement on the result page and how much extra the advertiser is willing to pay to be featured more prominently. For example, an advertiser bidding $0.03 per advertisement (e.g., based on number of displayed links or number of followed links, for example) that is being featured third in a list of advertisers might be willing to adjust the bid price to $0.10 per advertisement to instead be featured at the top of the list. While this can cost the advertiser more advertising spend, the number of extra users following the top link might more than make up for the additional cost. Further, an advertiser might make significantly more money from an advertisement at certain times of the day, week, year, etc., and thus might be willing to spend differently at different times. An advertising manager thus may also be configured to analyze revenue, conversion rates, historical data, and other information that can be stored with the advertising data in order to determine an appropriate price to bid for each ad.

Various other aspects also can be taken into consideration. For example, if an advertiser spends a significant amount of money to be featured with a keyword or category, the advertiser would like to display information in addition to the sponsored link that is successful in getting users to want to follow the link. For example, an advertiser could display a generic message with each advertisement, such as the name and slogan of the advertiser, but that message might in general be less effective than a message tailored to the content or keyword. In the example where the user is searching for information about automobiles, a message such as "Buy the latest parts for your automobile at discount prices" might be substantially more effective than a generic message "Big Box Store—we offer everything under the sun". An advertiser might also want to tailor the message even further, based on the category or keyword. For example, a user searching for information about an automobile that has not yet been placed into the market, such as next year's new hybrid vehicle, might not be interested in seeing a message about buying parts since the car is not yet available. It might be beneficial to instead display a message such as "Get the latest books and magazines about the next generation hybrids". While more narrowly tailored ads can be significantly more successful, however, the number of possible keywords, categories, and sub-categories is extremely large and there must be some decisions made as to which categories and keywords make financial sense to provide with tailored advertisements, and at what level in the subcategories does the advantage of a further tailored message no longer make sense.

Once an advertisement has been placed and a user actually clicks on or otherwise selects a sponsored link, the user is directed to a landing page such as may be specified by the advertiser through the advertising manager. Considering an example of an online marketplace that offers items in several different categories, a basic approach directs the user to the home page, welcome page, or other such introductory display for the marketplace. It can be more effective, however, to direct the user to a page (herein referred to as a "landing page") offering items or displaying information related to the keyword or category for which the advertiser decided to advertise and the user was searching for information. In the example where a user was searching for information about hybrid automobiles, an address for a landing page could be selected based on the landing page displaying information about automobiles, or potentially more advantageously, hybrid automobiles. Again, however, a decision can be made about the level that makes sense for each keyword or category. Given a marketplace with thousands or even millions of items, and the fact that there can be millions of possible categories and keywords, it can be desirable to have a system that automatically and accurately selects landing pages and other options for those choices that make financial sense for an advertiser. Conventional approaches may, for example, use a search index if the landing page is a search page or an item grouping if the landing page is a detail page for an item. These approaches typically do not get any more specific, and as such are of limited use or accuracy.

For each ad, an advertiser thus can desire to select an optimal landing page for each advertisement that will help to cause users to view and/or select the advertisement, and thus drive users to a landing page of the advertiser. There are many different approaches that can be used to select an appropriate landing page to associate with a keyword, such as the approaches described in co-pending U.S. patent application Ser. No. 12/204,650, filed Sep. 4, 2008, entitled "Landing Page Selection for Linked Advertising," which is hereby incorporated herein by reference in its entirety.

It is not enough, however, to decide to advertise for a given keyword and determine an appropriate landing page to associate with that keyword. An advertiser also considers aspects such as the type of creative elements to include in the advertisement, as well as how much to spend for each instance of the advertisement. Systems and methods in accordance with various embodiments address at least some of these issues by taking advantage of a dynamic categorization system that is able to automatically determine aspects such as appropriate bid amounts and/or creative elements for sponsored ads based on the classification of the item(s) or other content on the selected landing page.

Systems and methods in accordance with various embodiments can dynamically determine appropriate categorization for each landing page. In one approach, categorization is selected using a category hierarchy and/or browse graph such as those described previously. Such an approach enables the categorization to be much more precise, such that aspects such as the creative text and/or default bids for a sponsored link or advertisement including the landing page can be much more appropriate for the precise landing page.

Categorization as described herein can have particular advantage over conventional systems with respect to search results pages. For example, when a user searches for a general keyword in a search engine, such as "washington," that term can refer to any of a number of different people, places, or things, and there might be items relating to one of these people, places, or things in a number of different categories. In such a case, the "optimal" landing page might be a search results page, which lists the top items (e.g., the most relevant) and/or pages viewed by users searching using that keyword. In many conventional systems, any such search page would have a generic or blended template associated therewith, which at best would include an area to insert the keyword, such as "Find items related to washington at our site". In categorization systems in accordance with the various embodiments of the present disclosure, however, if a dominant node is located based on at least a set of the search results that corresponds to a category such as "books," for example, then creative elements can be associated with the keyword such that a user searching for information about "washington" in a search engine would see a sponsored ad including specific information such as "Find detailed information about washington in one of the many books offered through our site." The landing page of search results page displayed might still include items other than books, but the template and creative elements can be directed to the category that is most likely to be of interest to a user searching for information relating to that keyword. In some embodiments, the items at near the top of the results page can be weighted more strongly than the other results, such that if the top three items are books, for example, then a book category can be selected even if more of the top items are video items, for example.

Categorizations in at least some embodiments are determined based at least in part on the respective landing page(s). Each landing page will generally relate to a single item (herein referred to as a "detail" page) or a collection of items (herein referred to as a "search" or "browse" page). Each of these items in various embodiments can be classified into a number of different categorizations. For example, consider a book on World War II. A user searching for this book could, if browsing on a partner site, first go to a "book" category, then go to a sub-category such as "history books" or "war books", which then each could have a sub-category such as "World War II." Thus, the book could be reached by following either of what are referred to herein as the "browse paths." The browse paths in this example can be designated as, for example:

books→history→World War II
books→war→World War II

Since each sub-category relates to at least one category and/or other sub-category, a "browse graph" can be created which forms a hierarchy of categories and sub-categories, wherein each category and sub-category forms a node of the hierarchy or browse tree. The browse graph can be formed using any appropriate approach and/or technology. In one example, the browse graph is a directed acyclic graph, and each item is assigned to one or more sink nodes in the graph.

For each item on a display or results page, a browse graph not only creates hierarchical navigation paths for users, but can be used to determine each category or sub-category relating to an item, as well as factors such as how many browse paths pass through a given node in the tree. For example, a browse tree for the World War II example has two nodes, "books" and "World War II," which each appear in all the browse paths, and thus can be good indicators of a proper categorization for any item appearing in that World War II sub-category. As known in the art, a user might navigate to an item using any of a number of other navigational approaches, such as by searching or following a specific link, but each item still can have a classification assigned that can help determine information relating to the item as discussed elsewhere herein.

Figure 4:
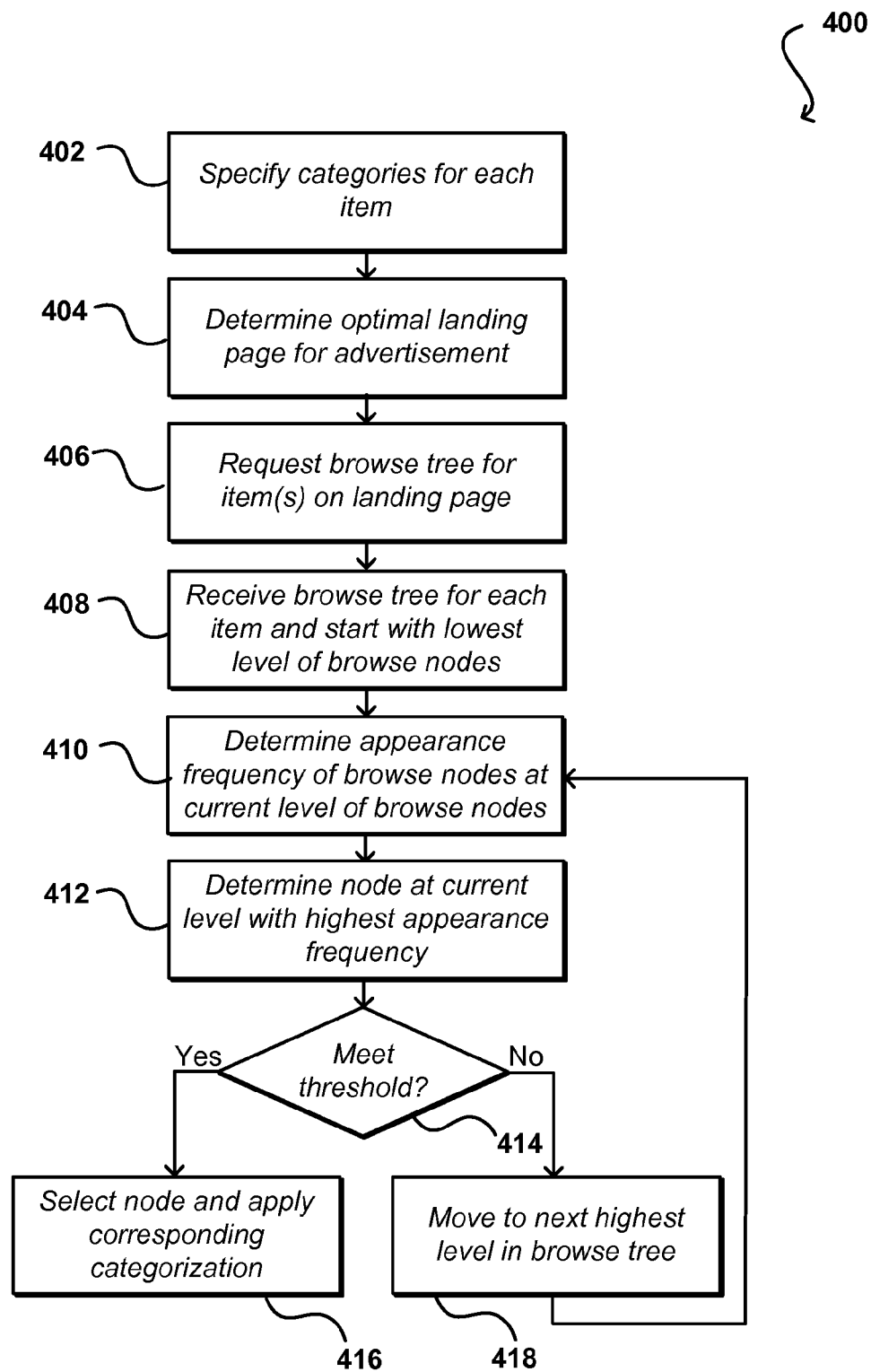
FIG. 4 illustrates steps of a process for determining optimal categorization that can be used in accordance with one embodiment.

FIG. 4 illustrates an example process 400 for determining an appropriate categorization for a landing page using such a browse graph that can be used in accordance with one embodiment. In this example, each item is assigned to a set of browse nodes in a categorization hierarchy or browse tree, corresponding to various ways of categorizing that item 402. For a sponsored ad or other such advertisement, an optimal landing page is selected for each keyword for which an advertisement is to be placed 404. A request, such as a Web services call, can be executed to obtain browse node assignments for any item(s) on the landing page 406. A response is received that contains a browse tree with any browse paths from the root of each categorization tree to the assigned node(s) for each item 408. The nodes of each browse path are analyzed to determine the frequency of the nodes at each level in the browse graph, in this example starting at a lowest (child) level of the browse graph 410. The system can maintain appropriate mappings from the browse nodes to the corresponding categorizations in one embodiment, such that parts of the browse graph can be excluded that are deemed irrelevant, or multiple browse nodes can be mapped to a single categorization as discussed elsewhere herein.

The browse nodes in one embodiment are examined by making a frequency map for each level in the browse tree. In one example, this includes starting at the lowest level of the browse graph and determining the total number of browse paths in which each node at that level is included. For landing pages that include multiple items, an alternative approach can involve determining the number of items for which each node at that level appears. In some embodiments a weighting can further be applied for multi-item landing pages based on factors such as the rank of each item in the results on the page as discussed elsewhere herein. For example, a keyword relating to a popular movie might return results in video, audio, toys, clothing, books, games, etc. In such a case, a configurable weighting can be applied based upon factors such as where different types of items appear in the results, how often those types of items appear, etc.

At each level, a determination is made as to the node with the highest frequency at that level 412. The frequency of that node can be analyzed to determine whether the frequency of the node meets or exceeds a specified threshold 414. For example, in order for any node to be selected the node might have to appear in at least 70% of the nodes at that level, although any appropriate threshold can be used and/or adjusted by an operator or other appropriate user. If the threshold is above 50% then there should only ever be one node at any level that meets the desired frequency threshold. If the threshold is below 50%, then weighting or other factors can be used to determine which categorization to select and/or apply if more than one node meets or exceeds the threshold. A blended categorization in such an example also can be used to determine factors such as creative elements and bid amounts based on all categories that meet or exceed the threshold.

If one of the nodes meets or exceeds the threshold, then that node is selected as the appropriate node and the corresponding categorization is applied 416. If not, the process moves to the next highest level 418 in the browse graph and analyzes the frequency of nodes at that level. The process can continue moving up the levels of the browse graph until either a node is determined to meet the specified threshold, or the process reaches the top level of the browse graph. In some embodiments, the top level will always be a single node that will correspond to a default category with specified aspects to be used by default. In other embodiments, the top level will have a single node for each tree included in the browse graph, and a blended categorization can be determined based upon factors such as the number of top nodes, the number of browse paths through each tree, etc.

While a default threshold such as 70% can be used, for example, a user can adjust this threshold up or down for specific categories based on the performance of the selections, and other such factors. In order to increase interest, a site operator might decide to reduce the threshold in an attempt to get more specific ads out in the marketplace. While the ad text and/or bids might not on average be as appropriate for the particular keywords, for example, the use of more specific ads might actually drive more users to follow the sponsored links.

Figures 5A, 5B, 5C:
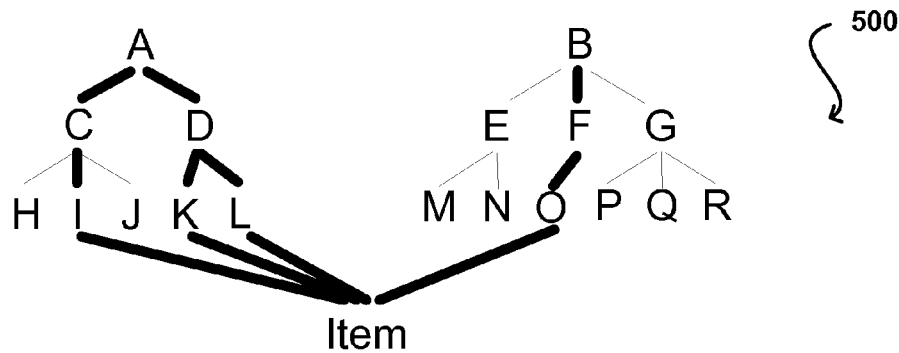
FIGS. 5(a)-(c) illustrate an approach to optimal node selection that can be used in accordance with one embodiment.

An example of applying a process such as that described with respect to FIG. 4 will be described with respect to FIGS. 5(a)-5(c). In this example, an optimal landing page has been determined which is a detail page for a single item, although many other types of landing page are possible as discussed elsewhere herein. A browse graph 500 is determined for the landing page as illustrated in FIG. 5(a). This example illustrates by relatively thick lines a set of browse paths through categorization trees for a system, although in some embodiments the browse graph will only contain those nodes included in at least one browse path for the item. Also, in some embodiments there will be a single parent node at the top that acts as the default node when no other consensus can be reached.

In this example, there are four browse paths for the item, corresponding to two different category trees. There are a number of nodes in each tree, and as illustrated the item in this example has three browse paths in the first tree and one browse path in the second tree. A process for selecting an appropriate node thus can look at the set of all paths through any tree for any item. FIG. 5(b) shows an example of a set of browse paths 520 for the item, wherein each browse path shows the path through the corresponding nodes at each level in the tree. As discussed, a process in accordance with one embodiment can begin by analyzing the nodes at the lowest level of the browse graph to attempt to find an appropriate categorization. In this example, the number of appearances of each node 540 are illustrated in FIG. 5(c). As can be seen, each node at the lowest level (here level three) only appears in one browse path. In other words the appearance frequency of each node at that level is one out of four, for an appearance frequency of 25%. Since no node is dominant over any other node at this level, none of these nodes likely would be selected as an appropriate categorization. Further, any threshold set to determine such dominance likely would not select any node that only appears only 25% at that level, at least for this number of nodes. As discussed, a threshold such as at least 50% could be selected such that a single dominant node can be selected at any level.

A categorization process then could move up to level 2. As can be seen, node "D" in this example appears twice, or in half of the browse paths, having an appearance frequency of 50%. If an operator has set a frequency threshold of 50%, then this can be sufficient for node D to be selected as a dominant node, and the categorization mapped to node D can be selected as the appropriate categorization.

In some cases, operators may prefer to utilize a more specific categorization where possible, such that a lower threshold can be specified and a node appearing in at least half the browse paths, for example, may be sufficient to select that node for the appropriate categorization. For operators who prefer to be more conservative, however, there may still not be a node at level two that can be considered to be dominant. If the algorithm then moves to level 1, node A appears three times, or in 75% of the browse paths. Depending on the threshold set, for example, this may be sufficient to select the categorization corresponding to node A to be selected as the appropriate categorization.

In cases with a high threshold, however, none of these nodes may be determined to be sufficiently dominant. In such a case, there can always be a fallback or default set of values, such as a blended set of values that includes somewhat generic text that can be used with any item, and an average or default bid price to be used in at least gathering information about a keyword. Although each category can have its own tree, the categories can be considered to be branches of a master or default node, such that any keyword will default to those values if no consensus can otherwise be reached. For example, creative text can be selected as default text for an advertisement that includes the name of the advertiser, a slogan, or other such information that can be applicable to any item or ad. There also can be text wherein the keyword can be dynamically substituted, such as "Buy items relating to [keyword] at low prices". The default bid in general can be relatively low, as a site operator might not want to spend too much money on a keyword until determining a level of performance. Other operators might instead bid highly for initial keywords to quickly make a performance decision, as the ad will likely win for any site displaying such ads and thus will more quickly provide an indication of effectiveness.

One example process described above assumes that there is little to no weighting for any particular category or tree, and looks only to relative frequency. In some cases, a system operator might decide to weight certain trees, categories, etc. In the example above, an operator wishing to weight the nodes of the first tree might apply a weighting factor such that node D, which only had a 50% appearance frequency, might rise above the categorization threshold after having a weighting factor applied. In another example, an operator wishing to drive business according to the second tree might specify that if no dominant node is selected at level 2, for example, then any node at level 2 for the second tree (e.g., node F) should be selected for the categorization. Various other weighting approaches can be used as should be apparent to one of ordinary skill in the art in light of the teachings and suggestions contained herein.

As discussed above, once a sufficient amount of data is obtained for an item or landing page, for example, then such approaches to categorization may no longer be used, or may at least only be a factor, in deciding how much to bid for a keyword to be associated with that item or page through a sponsored ad. For example, when a new item and landing page are presented, it can be desirable to categorize that item or page as closely as possible. An electronic marketplace offering thousands of items for consumption, for example, might want to bid different amounts for items such as books than items such as electronics. Further, the marketplace might want to bid different amounts for high volume but low profit items, such as compact discs, than for low volume but relatively high profit items, such as plasma screen televisions. Without any historical information, estimates of bid amounts can be determined by categorizing or otherwise classifying the keyword, item, and/or landing page as accurately as possible. For example, the bid amount for an ad with a general electronics landing page can be different from the bid amount for a television landing page, which can be different from a bid amount for a plasma screen television, which can be different from a bid amount for a high-definition plasma screen television, etc. When there is not much information available for the keyword itself, it can be desirable to categorize the ad's landing page as accurately as possible in order to make an educated estimate of the proper bid amount. As the amount of available information for that item increases, the bid amount can be adjusted up or down based upon that information, until enough information is available to determine the bid price independent of the classification.

Regardless of the amount of information available, however, the categorization approach still can be useful in determining aspects such as creative information, which as mentioned can include elements such as text, graphics, and other media, for example, as items associated with a keyword can change over time and it can be desirable to update the categorization as needed. Such an approach also allows the categorization to become more or less specific as needed. Such a dynamic and continually updating approach can provide optimal ads at any time and thus increase factors such as traffic and revenue as opposed to static systems that either do not change over time or require manual adjustment, which can be very difficult when the number of items and/or landing pages gets extremely large.

Once a dominant browse node is determined, and thus the appropriate category, information for the corresponding page or item can be updated in any appropriate fashion, such as by setting a value in a table or data store associated with the landing page. The value also can be associated with other information such as templates, text, graphics, media, or any other such information that can be used to generate creative information to be used with a sponsored ad. The value also can be associated with financial information for that categorization, which can help to determine an appropriate bid amount until enough information is available to determine an accurate bid for that landing page. When a sufficient level of information becomes available, a flag, value, or other such element can be set or stored such that bid amounts are determined based on the available information instead of the categorization, or using a combination of the two elements. In some cases, a combination of the categorization bid and bid amount based on the information can factor the categorization bid less and less as the amount of available information for a page increases, until finally the categorization bid is no longer a factor.

Figure 6A:
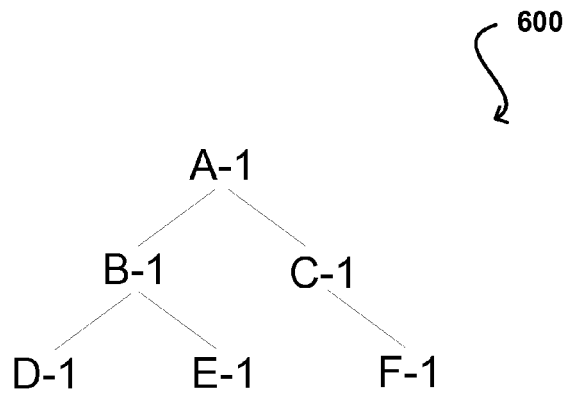
FIGS. 6(a)-(c) illustrate an approach to applying templates in a node hierarchy that can be used in accordance with one embodiment.

Templates and other creative elements often will be created manually, but the application of these templates to a particular landing page and/or sponsored ad can be a combination of manual and automatic processes. For example, FIG. 6(a) illustrates a tree of nodes 600 with top node A. A default template and set of creative elements can be created for node A, here set "1", which then can applied by default to each element in the tree such that there is a template assigned for each node in that tree. As illustrated, each node is associated with set 1. If the tree is for electronics-related pages, for example, then each page under the electronics category can have a general electronics-related template applied by default. Subsequently, an operator or other appropriate user might develop a template for a node at level 2, such as is illustrated in the updated tree 620 in FIG. 6(*b*) showing template 2 being assigned to node B. In this example, the operator can select an option to also apply the new template to all child nodes of node B. For example, if node B corresponds to a "cameras" sub-category under the "electronics" category, then each node under the cameras sub-node, which should all relate in some way to the cameras sub-category, can then inherit the template used for the cameras sub-category, which in general will be more specific than the general "electronics" template.

Figure 6B:
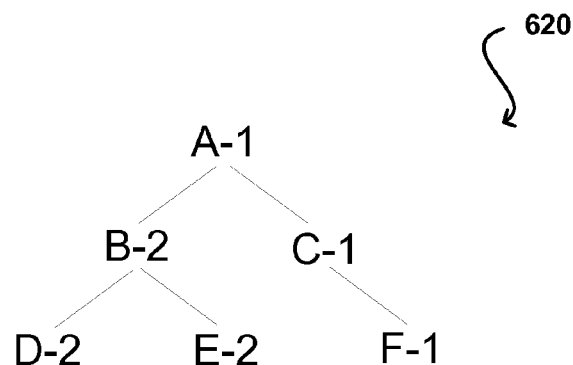
Figure 6C:
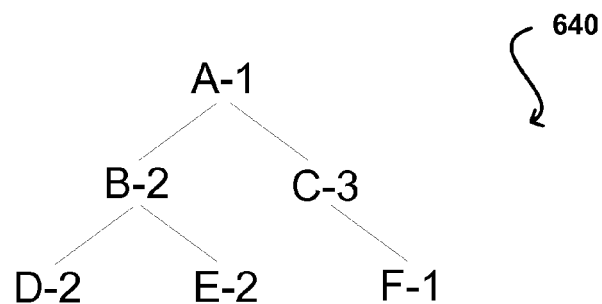

In some cases, such as is illustrated in the updated tree 640 of FIG. 6(*c*), an operator might create a template that is specific to a node, and may not want each child node to inherit the template. In this example, node C has had template 3 applied, but child node F retains default template 1 and does not inherit the updated template of the direct parent node. There can be a number of reasons for not having a new template default to at least some child nodes, such as where a child node might also be related to another category and the child node might thus be better left with more general creative elements. Since it can be impractical to create a unique template for each node in a large tree, it can be important to determine which template is used and/or inherited for each child node, particularly at the lower level nodes where specific templates may rarely be created and/or applied.

A system in accordance with one embodiment also can allow for the linking of various nodes. For example, an operator might decide to treat a "reggae" node and a "world music" node in the same way, such that separate decisions do not need to be made and the number of processes and determinations over time can be reduced. In one example, the reggae node could be designated as an implicit "child" node of world music that inherits any changes to the world music node and never has any decision made specifically for the reggae node. In other examples, the two nodes can be linked such that any change to one of the nodes is inherited by the other. The latter example can be preferred in some embodiments, as a node relying solely on a specific node can cause problems if an identifier or other aspect of the specific node changes, such that any node relying on that specific node may depend on node information that no longer exists, and thus may not update accordingly.

Various other factors can be considered in addition to, or in place of, browse graph information. For example, sales revenue in different categories can be considered such that, if an item is slightly more related to books than to electronics, but revenue and profit in electronics is significantly higher, then an electronics related template and ad can be selected for a given keyword. In another example, if the average profit per visitor is higher for books than for electronics, then the book category might be selected. There also can be various goals that can be used to weight specific categories. If an advertiser is attempting to promote a new category, then creative elements might be selected for that category any time a landing page is sufficiently related to that category, even though the item might be more related to another category.

Further, as discussed above various aspects of such a system also can be provided as a service. For example, an advertiser could supply a service with templates, landing pages, and categories, and the service could perform tasks such as selecting optimal landing pages, determining appropriate categorizations, and submitting the appropriate creative elements and/or bid amounts on behalf of the advertiser. In other embodiments, an advertiser might simply supply a set of landing pages and categories, and the service can determine appropriate categorizations, and generate creative elements and other aspects to be used with the advertising. In still other embodiments, an advertiser might only supply item and/or landing page information, and the generation of categories and browse trees, along with other aspects discussed herein, are handled by the service.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of determining an advertising template for a landing page, comprising:
    under control of one or more computer systems configured with executable instructions,
        receiving a request to select an advertising template for a landing page from among a plurality of advertising templates, the landing page associated with one or more items each corresponding to a respective set of one or more categories of a plurality of categories;
        determining a hierarchical category browse tree corresponding to the plurality of categories, each category corresponding to one of a plurality of category browse nodes in the hierarchical browse tree, each category browse node associated with one of the plurality of advertising templates;
        determining a plurality of browse paths through the hierarchical category browse tree, the plurality of browse paths corresponding to the respective set of one or more categories associated with each item of the landing page and determined based at least in part by traversing the hierarchical category browse tree from a highest level until reaching the category browse node corresponding to one category of the respective set of one or more categories associated with each item of the landing page; and
        for each level of the hierarchical category browse tree, beginning with a lowest level and until the advertising template for the landing page has been selected,
            determining a frequency of appearance for each category browse node at a current level that is included in one of the plurality of browse paths;
            selecting for the landing page the advertising template associated with the category browse node having a highest frequency of appearance when at least one category browse node at the current level meets a specified frequency threshold; and
            selecting for the landing page a default advertising template when the current level is the highest level of the hierarchical category browse tree and no category browse node is able to meet the specified frequency threshold.

2. The computer-implemented method of claim 1, wherein: each category browse node inherits the advertising template of a parent category browse node if no advertising template has been specifically associated with the category browse node.

3. The computer-implemented method of claim 1, wherein: each advertising template comprises at least one of text, one or more graphics, one or more images, one or more videos, or one or more audio components.

4. A computer-implemented method of determining a category for a landing page, comprising:
    under control of one or more computer systems configured with executable instructions,
        receiving a request to determine a category for a landing page from among a plurality of categories, the landing page associated with one or more items each corresponding to a respective set of one or more categories of the plurality of categories;
        determining a hierarchical category browse tree corresponding to the plurality of categories, each category corresponding to one of a plurality of category browse nodes in the hierarchical browse tree;
        determining a plurality of browse paths through the hierarchical category browse tree, the plurality of browse paths corresponding to the respective set of one or more categories associated with each item of the landing page and determined based at least in part by traversing the hierarchical category browse tree from a highest level until reaching the category browse node corresponding to one category of the respective set of one or more categories associated with each item of the landing page; and
        for each level of the hierarchical category browse tree, beginning with a lowest level and until the category for the landing page has been selected,
            determining a count for each category browse node at the level that is based at least in part upon a respective number of traversals of the category browse node by each browse path of the plurality of browse paths;

selecting for the landing page the category associated with the category browse node with a highest count when at least one category browse node at the level meets a specified threshold; and selecting for the landing page a default category when the level is the highest level and no category browse node at the level meets the specified threshold.

5. The computer-implemented method of claim 4, wherein:
each category browse node of the hierarchical category browse tree is associated with an advertising template.

6. The computer-implemented method of claim 5, wherein:
each category browse node inherits the advertising template of a parent category browse node when no advertising template has been specifically associated with the category browse node.

7. The computer-implemented method of claim 5, further comprising:
updating the advertising template associated with a specified category browse node of the hierarchical category browse tree with an updated advertising template.

8. The computer-implemented method of claim 7, wherein:
each descendant category browse node of the specified category browse node automatically inherits the updated advertising template of the specified category browse node.

9. The computer-implemented method of claim 7, wherein:
a descendant category browse node of the specified category browse node inherits the updated advertising template by directly associating the descendant category browse node with the updated advertising template.

10. The computer-implemented method of claim 7, wherein:
the specified category browse node and a second specified category browse node that is not a descendant category browse node of the specified category browse node are configured such that at least one of: (a) the specified category browse node inherits the updated advertising template of the second specified category browse node or (b) the second specified category browse node inherits the updated advertising template of the specified category browse node.

11. The computer-implemented method of claim 5, wherein:
each advertising template comprises at least one of text, one or more graphics, one or more images, one or more videos, or one or more audio components.

12. The computer-implemented method of claim 5, further comprising:
submitting to a provider a sponsored advertisement including the advertising template associated with the category browse node corresponding to the category selected for the landing page.

13. The computer-implemented method of claim 12, wherein:
the sponsored advertisement further includes a navigational element that is directed to the landing page when the navigational element is selected.

14. The computer-implemented method of claim 4, wherein:
the specified threshold is variable based at least in part upon at least one of a predetermined rank of the category corresponding to the category browse node, an order of the one or more items as they appear on the landing page, sales revenue, profit, visits, or a specified goal.

15. The computer-implemented method of claim 4, wherein:
the count is variable based at least in part upon at least one of a predetermined rank of the category corresponding to the category browse node, an order of the one or more items as they appear on the landing page, sales revenue, profit, visits, or a specified goal.

16. The computer-implemented method of claim 4, wherein:
the hierarchical category browse tree is truncated to remove at least one second category browse node and each child category browse node of the second category browse node.

17. A system for dynamically determining a categorization for an item, comprising:
a processor; and
a non-transitory memory device including instructions that, when executed by the processor, cause the processor to:
receive a request to determine a category for a landing page from among a plurality of categories, the landing page associated with one or more items each corresponding to a respective set of one or more categories of the plurality of categories;
determine a hierarchical category browse tree corresponding to the plurality of categories, each category corresponding to one of a plurality of category browse nodes in the hierarchical browse tree;
determine a plurality of browse paths through the hierarchical category browse tree, the plurality of browse paths corresponding to the respective set of one or more categories associated with each item of the landing page and determined based at least in part by traversing the hierarchical category browse tree from a highest level until reaching the category browse node corresponding to one category of the respective set of one or more categories associated with each item of the landing page; and
for each level of the hierarchical category browse tree, beginning with a lowest level and until the category for the landing page has been selected,
determine a count for each category browse node at the level that is based at least in part upon a respective number of traversals of the category browse node by each browse path of the plurality of browse paths;
select for the landing page the category associated with the category browse node with a highest count when at least one category browse node at the level meets a specified threshold; and
select for the landing page a default category when the level is the highest level and no category browse node at the level meets the specified threshold.

18. The system of claim 17, wherein:
each category browse node of the hierarchical category browse tree is associated with an advertising template.

19. The system of claim 18, wherein:
wherein each category browse node inherits the advertising template of a parent category browse node if no advertising template has been specifically associated with the category browse node.

20. The system of claim 18, wherein:
each advertising template comprises at least one of text, one or more graphics, one or more images, one or more videos, or one or more audio components.

21. The system of claim 18, wherein the memory further includes instructions that, when executed by the processor, cause the processor to:

submit to a provider a sponsored advertisement including the advertising template associated with the category browse node corresponding to the category selected for the landing page.

22. A non-transitory computer-readable medium including instructions for determining a category for a landing page, the instructions when executed by a processor of a computing device cause the computing device to:

receive a request to determine a category for a landing page from among a plurality of categories, the landing page associated with one or more items each corresponding to a respective set of one or more categories of the plurality of categories;

determine a hierarchical category browse tree corresponding to the plurality of categories, each category corresponding to one of a plurality of category browse nodes in the hierarchical browse tree;

determine a plurality of browse paths through the hierarchical category browse tree, the plurality of browse paths corresponding to the respective set of one or more categories associated with each item of the landing page and determined based at least in part by traversing the hierarchical category browse tree from a highest level until reaching the category browse node corresponding to one category of the respective set of one or more categories associated with each item of the landing page; and for each level of the hierarchical category browse tree, beginning with a lowest level and until the category for the landing page has been selected, determine a count for each category browse node at the level that is based at least in part upon a respective number of traversals of the category browse node by each browse path of the plurality of browse paths;

select for the landing page the category associated with the category browse node with a highest count when at least one category browse node at the level meets a specified threshold; and select for the landing page a default category when the level is the highest level and no category browse node at the level meets the specified threshold.

23. The non-transitory computer-readable medium of claim 22, wherein:

each category browse node of the hierarchical category browse tree is associated with an advertising template.

24. The non-transitory computer-readable medium of claim 23, wherein:

each category browse node inherits the advertising template of a parent category browse node if no advertising template has been specifically associated with the category browse node.

25. The non-transitory computer-readable medium of claim 23, wherein:

each advertising template comprises at least one of text, one or more graphics, one or more images, one or more videos, and one or more audio components.

26. The non-transitory computer-readable medium of claim 23, wherein the instructions when executed further cause the computing device to:

submit to a provider a sponsored advertisement including the advertising template associated with the category browse node corresponding to the category selected for the landing page.

* * * * *